Dec. 8, 1964 F. W. ANDERS 3,159,979

THERMOELECTRIC SYSTEM

Filed June 27, 1963 4 Sheets-Sheet 1

INVENTOR.
FRANK W. ANDERS

BY

ATTYS.

INVENTOR.
FRANK W. ANDERS
BY D. L. Hodges
Vincent L. Carney
ATTYS.

INVENTOR.
FRANK W. ANDERS
BY J. C. Hodges
Vincent L. Carney
ATTYS.

INVENTOR.
FRANK W. ANDERS
BY
Vincent L. Carney
ATTYS.

United States Patent Office 3,159,979
Patented Dec. 8, 1964

3,159,979

THERMOELECTRIC SYSTEM

Frank W. Anders, 6104 River Road, Bethesda, Md.

Filed June 27, 1963, Ser. No. 291,225
13 Claims. (Cl. 62—3)
(Granted under Title 35, U.S. Code (1952), sec. 266)

The invention described herein may be manufactured and used by or for the Government of the United States of America for governmental purposes without the payment of any royalties thereon or therefor.

This invention relates to thermoelectric cooling devices and more particularly relates to an efficient Peltier thermocouple for efficient heat transfer.

The Peltier effect, which causes heat to be absorbed at one junction of two dissimilar materials, and transported to and emitted from the other junction of the same materials by electric current, has recurrently been considered as a mechanism for cooling or refrigeration on a practical scale. However, practical application of this effect has not proved satisfactory due to the low efficiency of Peltier thermoelements.

The efficiency of Peltier thermoelements is reduced by joulian heat production in the thermoelement itself, and by the transfer of heat back to the cooled area by radiation or convexion. Accordingly, it is an object of this invention to provide a Peltier thermoelement in which the joulian heat production and the heat transfer is reduced to a minimum.

It is a further object of this invention to provide an efficient radiator which utilizes the Peltier effect.

It is a still further object of this invention to provide an air conditioner which utilizes the Peltier effect.

It is another object of this invention to provide an improved refrigerator coil in which the removal of heat from the cold chamber is aided by the Peltier effect.

Other objects and many of the attendant advantages of this invention will be readily appreciated as the same becomes better understood by reference to the following detail description when considered in connection with the accompanied drawings wherein.

Figure 1:
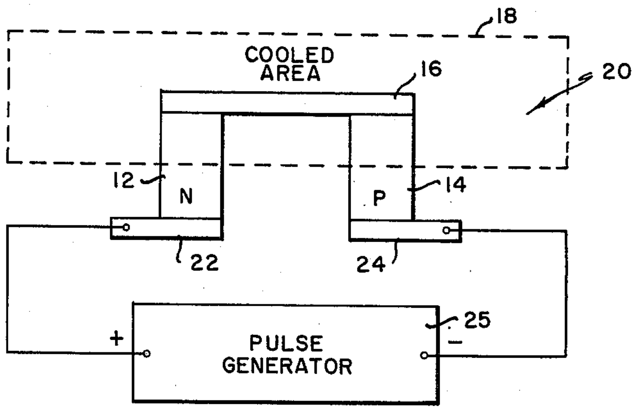
FIG. 1 is a block diagram of a Peltier thermoelement as used in this invention.

Referring now in particular to FIG. 1 of the drawings, a thermocouple is shown having a body of N type material 12, a body of P-type material 14, and a conductor 16 connecting the body of N-type material 12 and the body of P-type material 14. The conductor 16 is enclosed by insulating wall 18 so as to form a cold chamber 20. A conductor 22 is connected to the body of N-type material and is outside of the cold chamber 20; a conductor 24 is connected to the body of P-type material and is also outside the cold chamber 20. Conductor 22 is connected to positive terminal of the pulse generator 25 and conductor 24 is connected to the negative terminal of pulse generator 25.

Current pulses from the pulse generator 25 will cause heat to be transferred from junction 16 to junctions 22 and 24. The amount of heat transferred is called the Peltier heat. The Peltier heat in watts is equal to the current in amperes times the temperature in Kelvin degrees times the difference in thermoelectric power in volts per degree centigrade between the N-type material and the P-type material. Thermoelectric power is the thermoelectric force per degree at a junction or the voltage drop across the junction divided by the temperature.

The amount of heat transferred is reduced by the joule heat generated within the thermocouple legs and thermally conducted to the cold junction and by the thermal leakage from the hot junction to the cold junction. The joule heat generated is simple equal to the current squared multiplied by the resistance of the material.

Qualitatively, good Peltier thermocouple materials for the N-type material 12 and the P-type material 14 should exhibit high thermoelectric power, low thermoconductivity and low electric resistivity. A figure of merit indicative of the quality of materials for Peltier thermocouple can be defined from these quantities. Among the materials exhibiting the highest figures of merit are the semiconductor compounds lead telluride (PbTe), bismuth telluride ($Bi_2Te_3$), and bismuth selenide ($Bi_2Se_3$). Throughout this specification the materials referred to as N-type materials and P-type materials will be P-type bismuth telluride and N-type bismuth telluride.

P-type bismuth telluride is bismuth telluride doped with approximately 0.25 atomic percent lead and N-type bismuth telluride is bismuth telluride doped with approximately .025 atomic percent iodine. A typical sample of P-type bismuth telluride will have a thermoelectric power of 180 microvolts per degree centigrade, a resistivity of $2\times10^{-3}$ ohms-centimeters and a thermoconductivity of $2\times10^{-2}$ watts per centimeter degrees centigrade. A material with these constants will have a figure of merit of 0.028 (° C.)1/2, which is arrived at by dividing the thermoelectric power by the square root of the produce of the resistivity and the thermoconductivity. A similar sample of N-type bismuth telluride will have a thermoelectric power of a negative 150 microvolts per degree centigrade, a resistivity of $8.5\times10^{-4}$ ohms centimeters, and a thermoconductivity of $2\times10^{-2}$ watt per centimeter degrees centigrade. This will provide a figure of merit of 0.036 (° C.)1/2.

Increasing the junction area and reducing the length of the P and N type materials of thermoelectric reduce the joulian heat production. The Peltier effect takes place at the junction within several micro-seeconds. The transfer of joulian heat to the junction on the other hand takes several seconds. Consequently, the use of high frequency pulses reduces the transfer of joulian heat to the junction and increases the efficiency of the thermoelement.

Figure 2:
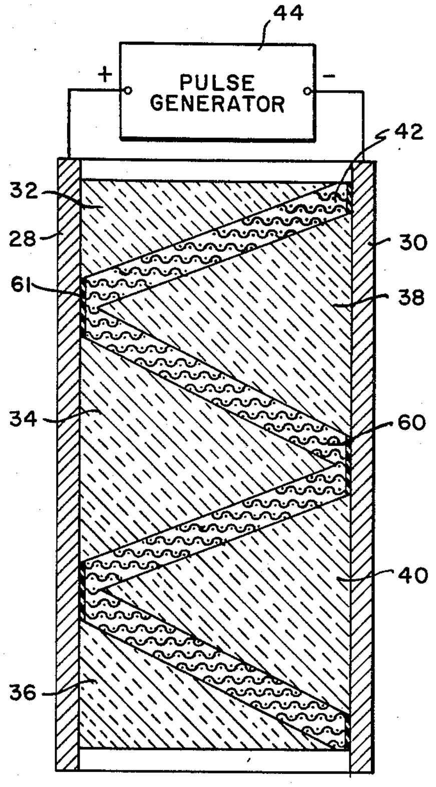
FIG. 2 is a section of a thermoelement device useful in radiators.

FIG. 2 is a longitudinal section of a cooling tube for use in radiator. This cooling tube utilizes the Peltier effect according to the invention. Two sides of the cooling tube 28 and 30 are conductors which may be of copper or nickel. Pyramid shape bodies of N-type materials 32, 34 and 36 are placed with a flat side against metallic plate 28. These bodies of material do not touch metallic plate 30. Between the bodies of N-type material and spaced apart from them are bodies of P-type material 38 and 40 which have one side in contact with metallic conductor 30. A continuous opening through the cooling tube 42 is formed between the bodies of N-type material and P-type material. A pulse generator 44 has its positive terminal connected to metallic plate 28 and its negative terminal connected to metallic plate 30. This pulse generator 44 provides high frequency D.C. pulses to each of the bodies of P and N-type material. A wire mesh made of some metal such as copper or nickel is inserted in the opening 42. The wire mesh 60 forms a conducting junction between the bodies of N-type material, which receive positive pulses from pulse generator 44, and the bodies of P-type material which receive negative pulses from pulse generator 44. It is of course obvious that wire mesh 60 is inserted into opening 42 in such a manner as to prevent the mesh from forming a conductive path between the junction and metallic plates 28 and 30, thereby forming a short circuit. To insure against a conductive path being formed, insulating material 61 may be placed at the various points wherein the mesh 60 is in close proximity to the metallic plates 28 and 30. It can be seen that the cooling tube of FIG. 2 will operate according to the Peltier effect to remove heat from the tube 42 and dissipate it in the metallic conductors 28 and 30. A coolant may be passed through the tube 42 and have heat removed from it.

Figure 3:
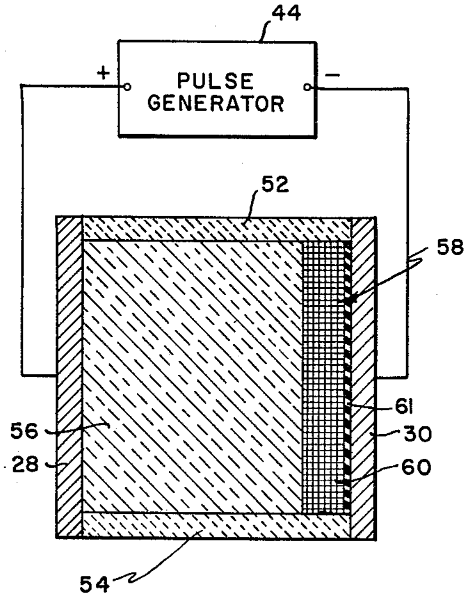
FIG. 3 is a top section of the radiator cooling tube shown in FIG. 2.

A top view of the cooling tube shown in FIG. 2 is shown in FIG. 3. Two metallic sides 28 and 30 are electrically connected to the pulse generator 44. The pulse generator may be of the thyratron blocking oscillator type such as that shown on pages 10–14 of "Electronic Designers Handbook" by Robert W. Landee, Donovan C. Davis and Albert P. Albrech; McGraw-Hill 1957. The other two sides of the cooling tube are made of insulating material 52 and 54. Blocks of P or N-type material 56 are connected to the conducting sides of the cooling tube, with blocks of P-type material connected to the side 30 and the blocks of N-type material connected to the side 28. The side 28 is connected to the positive terminal of the pulse generator 44 and the side 30 is connected to the negative terminal of the pulse generator 44. A continuous opening 58 between the blocks of P-type material and N-type material is filled with a metallic wire mesh 60 through which water may flow.

Figure 4:
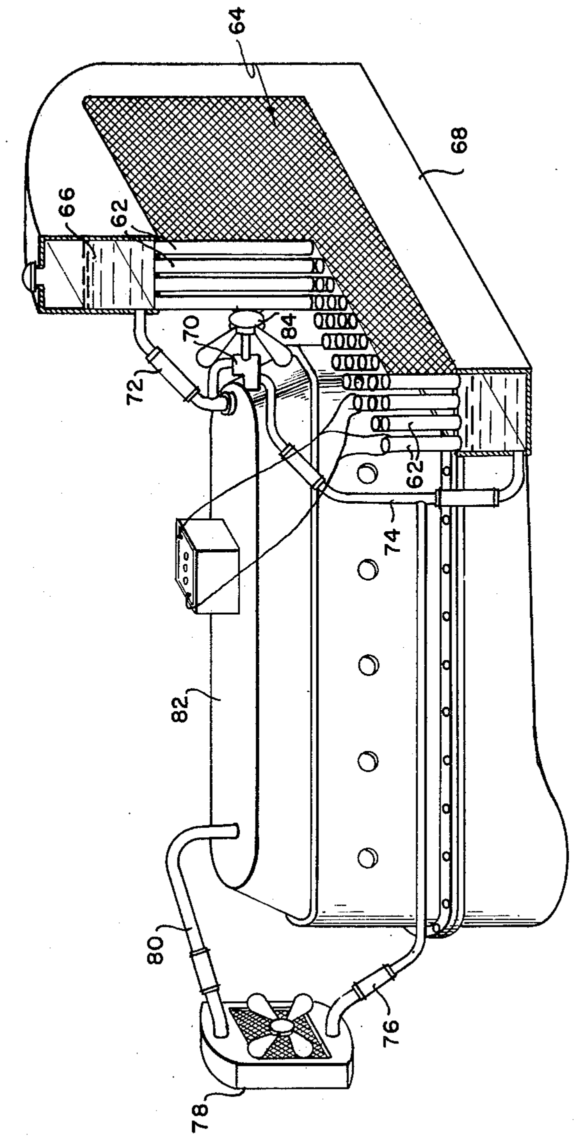
FIG. 4 is a simplified perspective partially broken out of an automobile radiator and motor incorporating thermoelement design shown in FIGS. 2 and 3.

The cooling tubes 62 shown in the radiator 64 in FIG. 4 may be constructed as shown in FIGS. 2 and 3. These tubes are each connected in parallel and are connected at one end to the water reservoir 66 in the radiator and at the other end to the reservoir 68. A water pump 70 pumps a coolant, which may be water, through the hose 72 and into the reservoir 66. The water from the reservoir 66 flows through the vertically placed parallel cooling tubes 62 to the reservoir 68. The hose 74 connects the reservoir 68 to the water pump 70 which recirculates the water through the motor block 82, to the hose 72 and back into reservoir 66. The coolant is also circulated through hose 76 to the automobile heater 78 and the hose 80 to the motor block 82 and through the motor block to the hose 72 and back into the reservoir 66. As the water flows through the parallel cooling tubes 62 heat is removed from the water and dissipated on the outer surfaces of the cooling tubes. The fan 84 is driven by the motor and blows air against the outer surfaces of the cooling tube 62 so as to remove the heat therefrom.

Figure 5:
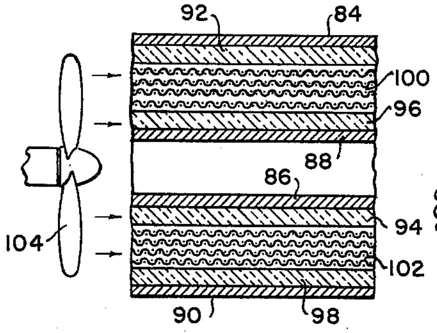
FIG. 5 is a longitudinal section of another radiator cooling tube.

The cooling tube 62 may be connected in parallel in series so that the same water flows through each of them. While this may be done with vertically position tubes the water pump will have to be too large and horizontal cooling tube are preferable. A section of the cooling tube intended to be used in a horizontal position in an automobile radiator is shown in FIG. 5. Conductors 84 and 86 are connected to the positive terminal of a pulse generator. Conductors 88 and 90 which are insulated from conductors 84 and 86 are connected to negative terminal of a pulse generator. N-type material 92 is connected to conductor 84; N-type material 94 is connected to conductor 86; P-type material 96 is connected to conductor 88; P-type material 98 is connected to conductor 90. Copper mesh 100 connects N-type material 92 to P-type material 96; copper mesh 102 connects N-type material 94 to P-type material 96. Water is forced through the copper mesh 100 and 102 and is cooled thereby. A fan 104 forces air against the conductors 88 and 86 so as to remove heat from the radiator.

Figure 6:
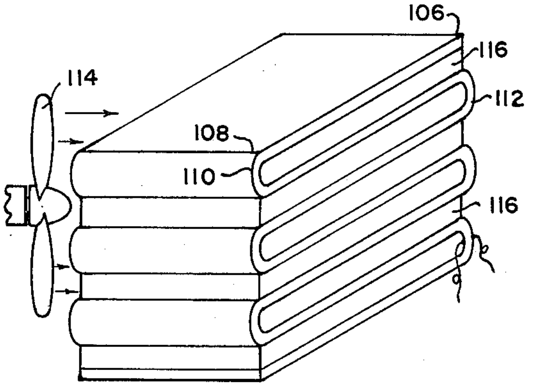
FIG. 6 is a simplified perspective view of a radiator which utilizes the thermoelectric cooling tubes shown in FIG. 5.

A perspective view, showing the arrangement of the cooling tubes in a series radiator is shown in FIG. 6. The tubes are rectilinear in form and connected in series. Water enters the top most tube in an opening 106 and flows through the copper mesh in the tube to the other end 108. The top tube is connected to the second tube from the top by a connecting conduit 110. The water flows through this conduit into the cooling tube second from the top to conduit 112 and through this conduit into the third tube from the top. In this way the water makes its way from a reservoir on top of the radiator to one on the bottom. A fan 114 blows air through a space between the tubes 116 so as to remove the heat which has been transferred to the outer surfaces of the cooling tubes.

Figure 7:
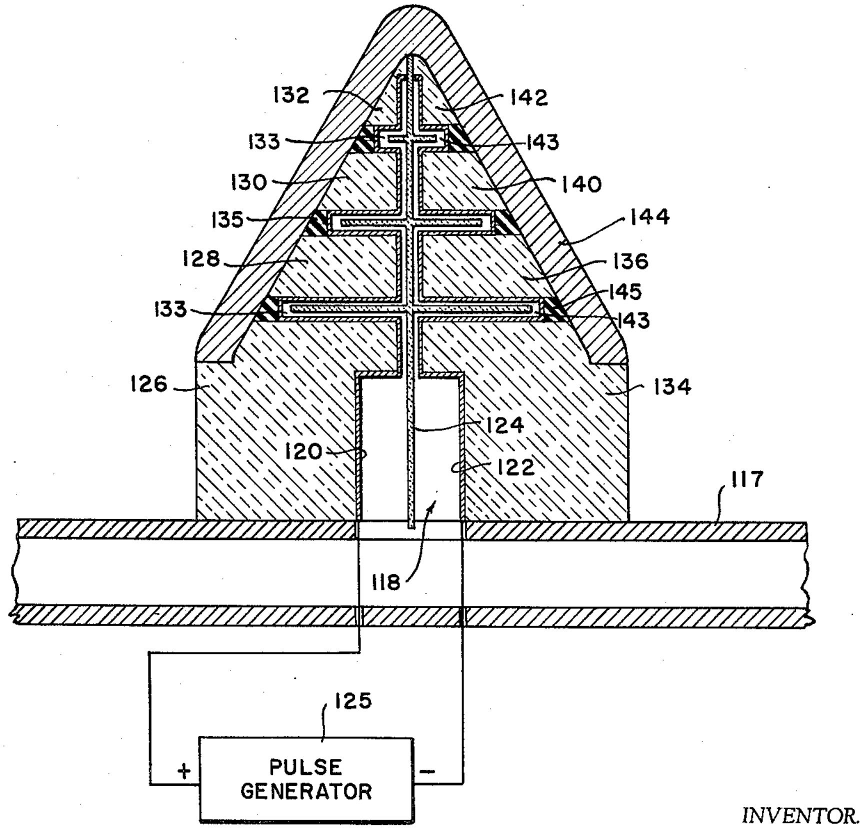
FIG. 7 is a sectional view of a refrigerator heat exchanger which utilizes the thermoelement design of this invention.

A cooling element which utilizes the Peltier effect to aid in transferring heat from the cold chamber to the coolant is shown in section of FIG. 7. In FIG. 7 a coolant which, for example, may be supplied by the compressor of a gas refrigerator operated by the exhaust fumes of a car flows through conduit 117 and through the inside of the cooling element through conduit 118. One side of the conduit 118 is lined with a conductor 120 and the other side is lined with conductor 122. The two conductors are separated by insulating material 124. Conductor 120 is electrically connected to the positive terminal of pulse generator 125 and conductor 122 is connected to the negative terminal of pulse generator 125. This pulse generator provides voltage pulses with a repetition rate of several hundred kilocycles per second. The conduit 118 separates several bodies of N-type material from each other and from a corresponding group of bodies of P-type material.

Four bodies of N-type material 126, 128, 130 and 132, each having a triangular shape when taken in transverse cross section, are electrically connected to conductor 120. The portions 126, 128, 130 and 132 are spaced from each other so as to form passageways 133 through which the coolant may flow. The ends of these passageways which are close to the exterior of the cooling element are filled with insulating material 135. The surfaces of these bodies which are on the interior of the cooling element are coated by the conducting material 120.

Four bodies of P-type material 134, 136, 140 and 142, each having a triangular shape when taken in transverse cross section, are electrically conneced to the conductor 122. These bodies are also spaced apart from each other so as to leave passageways 143 through which the coolant may flow. The exterior ends of the passageways are filled with an insulating material 145 and the interior surfaces of the passageways are covered by conductor 122. The outer surface of the cooling element formed by the outer surfaces of the bodies 126, 128, 130, 132, 140, 142, 134 and 136 are coated by a conducting material 144 which may be of nickel or copper. This conducting material forms the cold junction between the N and P-type bodies of material.

The voltage pulses from pulse generator 125 cause heat to be transferred from the conducting material 144 which forms the cold junction to the conducting materials 120 and 122 which form the hot junction of the thermoelement. The coolant removes the heat from this junction. This structure may increase the efficiency of a refrigerator by aproximately 33⅓%.

Figure 8:
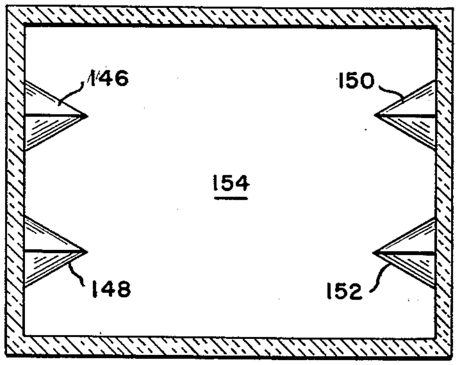
FIG. 8 is a sectional view which shows the arrangement of the heat exchangers shown in FIG. 7 around the cold chamber of a refrigerator.

The cooling element may be mounted around the cold chamber as shown in FIG. 8, in which the pyramid shape cooling element 146, 148, 150 and 152 are shown protruding into the inside of cold chamber 154. These cooling element, which are of the type shown in FIG. 7, include 4 bodies of P-type material and 4 bodies of N-type material connected together by a metallic cold junction. The cold chamber should have a capacity of approximately one cubic foot. The coolant may be either alcohol or Freon and may be used in a closed cycle compressor.

Figure 9:
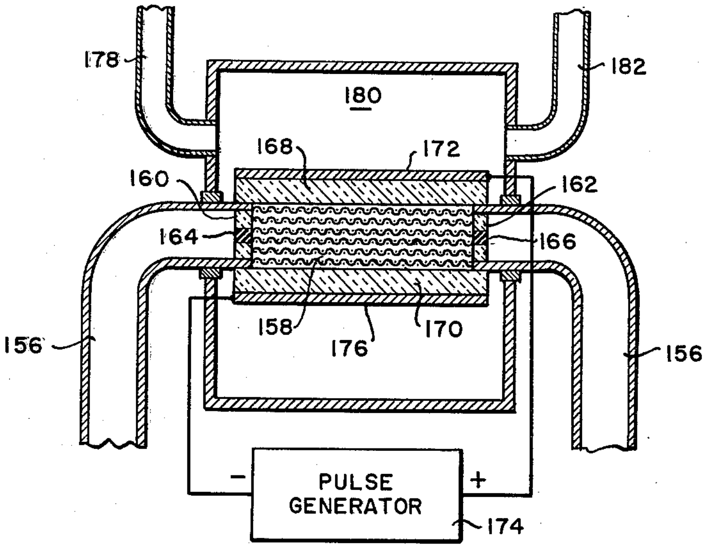
FIG. 9 is a longitudinal section of an air conditioner which utilizes the invention.

A heat transfer device for use in an automobile refrigerator is shown in section in FIG. 9. Air from the automobile is forced through conduit 156 through the cooling element. The air is passed through a copper mesh 158 which is held in the conduit by retaining rings 160 and 162 which has central holes 164 and 166 to permit the passage of air. In the center of the conduit is a body of N-type material 168 in the shape of a half cylinder which covers one half of the conduit 156, and a body of P-type material 170 in the shape of a half cylinder which covers most of the rest of the conduit 156. The body of N-type material 168 and P-type material 170 are separated by insulators and together with the insulators form hollow right cylinder around the conduit 156 in the center and in contact with the conducting mesh 158 which fills the conduit at its center. A metallic conducting surface 172 covers the surface area of the body of N-type material 168 and is electrically connected to the positive terminal of pulse generator 174; conducting material 176 covers the outer surface of the body of P-type material 170 and is electrically connected to the negative terminal of pulse generator 174. The pulse generator 174 causes heat to be transferred from the conduit 156 at the cold junction formed by the wire mesh 158 to the outer conductors 172 and 176. Air from the outside of the automobile is blown through the conduit 178 into the chamber 180 which surrounds the outer conductors 172 and 176 and out of the chamber through conduit 182 so as to remove the heat dissipated by conductors 172 and 176.

Figure 10:
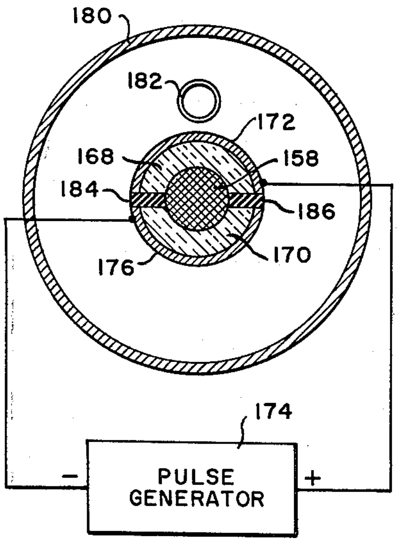
FIG. 10 is a side sectional view of the air conditioner of FIG. 9.

A front sectional view of the automobile air conditioner is shown in FIG. 10 having the conduit 156 filled in its center with the copper mesh 158 and covered at its upper most half by the half cylinder of N-type material 168 and at its bottom half by the half cylinder of P-type material 170. The conducting surface 172 on N-type material 168, is electrically connected to the positive terminal of pulse generator and a conducting surface 176 which covers the body of P-type material 170 is electrically connected to the negative terminal of pulse generator 174. The half cylinder formed by the body of N-type material 168 and the surface coating 172 is separated from the half cylinder formed by the body of P-type material 170 and its surface conductor 176 by the two insulators 184 and 186. A chamber 180 controls the flow of air against conductors 176 and 172 so as to remove heat from these conductors through the conduits 182 which leads out of this chamber.

Obviously, many modifications and variations of the present invention are possible in the light of the above teachings. It is therefore to be understood that within the scope of the appended claims the invention may be practiced otherwise than as specifically described.

What is claimed is:

1. A cooling element comprising:
generator means for generating D.C. pulses with a pulse width of less than one millisecond having a positive terminal and a negative terminal;
a first conductor electrically connected to said positive terminal of said generator means;
a body of N-type material, electrically connected to said first conductor;
a second conductor electrically connected to said negative terminal of said generator means;
a body of P-type material, electrically connected to said second conductor;
a third conductor, electrically connecting said body of N-type material and said body of P-type material; and
a container enclosing said third conductor and separating said third conductor from said first and second conductors, whereby heat is removed from said container by the cooling of said third conductor and heat is dissipated by said first and second conductor.

2. A cooling element comprising:
generator means for generating D.C. pulses having a positive terminal and a negative terminal;
a first conductor electrically connected to said positive terminal of said D.C. pulse generator;
a body of N-type material, electrically connected to said first conductor;
a second conductor electrically connected to said negative terminal of said D.C. pulse generator;
a body of P-type material, electrically connected to said conductor;
a wire mesh third conductor, electrically connecting said body of N-type material and said body of P-type material; and
a container enclosing said third conductor and separating said third conductor from said first and second conductors, whereby heat is removed from said container by the cooling of said third conductor and heat is dissipated by said first and second conductors.

3. A cooling element comprising:
voltage generator means for generating D.C. pulses with a pulse width of less than one millisecond, having a positive terminal and a negative terminal;
a first conductor, electrically connected to said positive terminal of said D.C. pulse generator;
a plurality of bodies of N-type material, each body being electrically connected in parallel to said first conductor;
a second conductor electrically connected to said negative terminal of said D.C. pulse generator;
a plurality of bodies of P-type material, each body being electrically connected in parallel to said second conductor;
a wire mesh third conductor, electrically connecting said bodies of N-type material to said bodies of P-type material;
a container enclosing said third conductor and separating said third conductor from said first and second conductors, whereby heat is removed from said container by the cooling of said third conductor and heat is dissipated by said first and second conductors; and
pump means for moving a fluid against said first and second conductors, whereby heat is removed from said first and second conductors.

4. A cooling element comprising:
generator means for generating D.C. pulses with a pulse width of less than one millisecond, having a positive terminal and a negative terminal;
a first conductor electrically connected to said positive terminal of said D.C. pulse generator;
a plurality of bodies of N-type material, each body being electrically connected in parallel to said first conductor;
a second conductor electrically connected to said negative terminal of said D.C. pulse generator;
a plurality of bodies of P-type material, each body being electrically connected in parallel to said second conductor;
a wire mesh third conductor, electrically connecting said bodies of N-type material to said bodies of P-type material;
a container enclosing said third conductor and separating said third conductor from said first and second conductors, whereby heat is removed from said container by the cooling of said third conductor and heat is dissipated by said first and second conductors;

pump means for moving a fluid through said wire mesh conductor whereby heat is removed from said fluid; and fan means for blowing air against said first and second conductors.

5. A cooling element comprising:

a first conductor electrically connected to a positive terminal of a D.C. pulse generator;

a body of N-type material, electrically connected to said first conductor;

a second conductor electrically connected to a negative terminal of said D.C. pulse generator;

a body of P-type material, electrically connected to said second conductor;

a wire mesh third conductor, electrically connecting said body of N-type material and said body of P-type material;

a container enclosing said third conductor and separating said third conductor from said first and second conductors, whereby heat is removed from said container by the cooling of said third conductor and heat is dissipated by said first and second conductors; and fan means for blowing air through said wire mesh conductor.

6. An automobile cooling system comprising:

conduit means, adjacent to the motor block of said automibile along part of its path, for constraining the flow of a coolant liquid;

pump means, having an inlet and an outlet in communication with said conduit means, for forcing water through said conduit means;

a plurality of cooling tubes each having one end connected to one end of said conduit means to receive said coolant liquid from said conduit means and each having the other end connected to the other end of said conduit means to release said coolant liquid into said conduit means;

each of said cooling tubes having two electrically conductive portions on its inner surface separated by insulating portions;

generating means for generating D.C. voltage pulses, having a positive terminal electrically connected to a first of said conductive portions of each of said cooling tubes and having a negative terminal electrically connected to the second of said conductive portions of each of said cooling tubes;

a body of N-type material electrically connected to each of said first conductive portions of said cooling tubes;

a body of P-type material electrically connected to each of said second conductive portions of said cooling tubes;

a perforated conductor electrically connecting said P-type material and said N-type material in each of said cooling tubes, whereby heat is transferred from said coolant liquid to said perforated conductor; and fan means, mounted opposite to said cooling tubes, for blowing air against the outside of said cooling tubes, whereby heat is transferred from said cooling tubes.

7. An automobile cooling system as defined in claim 6, in which said cooling tubes are vertical with respect to the automobile and are in parallel with respect to the flow of water.

8. An automobile cooling system as defined in claim 7, in which said body of N-type material and said body of P-type material have parallel surfaces with an irregular shape.

9. An automobile cooling system as defined in claim 6, in which said cooling tubes are horizontal with respect to the automobile and are connected to one another in series.

10. An automobile air conditioner, comprising:

a cooling tube having two electrically conductive portions on its inner surface separated by insulating portions;

generating means for generating D.C. voltage pulses, having a positive terminal electrically connected to a first of said conductive portions of said cooling tube and having a negative terminal electrically connected to the second of said conductive portions of said cooling tube;

a body of N-type material electrically connected to said first conductive portions of said cooling tube;

a body of P-type material electrically connected to said second conductive portion of said cooling tube;

a perforated conductor electrically connecting said P-type material and said N-type material in said cooling tube, whereby heat is transferred from said cooling tube;

conduit means connecting said cooling tube with the inside of said automobile; and fan means, positioned near an opening of said conduit means for forcing air through said conduit means and cooling tube, whereby the air in the automobile is cooled.

11. An automobile air conditioner as defined in claim 10, in which said generating means is a millimicrosecond pulse generator.

12. In a refrigerator system having a cooling compartment which is to be cooled, a coolant for carrying heat, a radiator for radiating heat outside of said cooling compartment and a hollow cooling element into which said coolant is released, the combination with said hollow cooling element of:

a conductive surface on the inside of said hollow cooling element;

a body of P-type material in contact with a portion of said conductive surface;

a body of N-type material in contact with a second portion of said conductive surface;

insulating material separating said P-type material and said N-type material;

a second conductor electrically connected to said body of P-type material on the inside of said hollow cooling element;

a third conductor electrically connected to said body of N-type material on the inside of said hollow cooling element; and voltage generating means, having a positive terminal electrically connected to said third conductor and having a negative terminal electrically connected to said second conductor, for generating D.C. pulses.

13. In a refrigerator system having a cooling compartment which is to be cooled, a coolant for carrying heat, a radiator for radiating heat outside of said cooling compartment and a plurality of hollow heat exchange elements into which said coolant is released, the combination with each of said hollow heat exchange elements of:

a different conductive surface on the inside of each of said hollow heat exchange elements;

a different body of P-type material in contact with a portion of each conductor of said set of conductive surfaces;

a different body of N-type material in contact with a second portion of each conductor of said set of conductive surfaces;

insulating material separating each body of P-type material from each body of N-type material;

a different conductor of a second set of conductors electrically connected to each of said bodies of P-type material on the inside of each of said hollow heat exchange elements;

a different conductor of a third set of conductors electrically connected to each of said bodies of N-type material on the inside of each of said hollow heat exchange elements; and voltage generating means, having a positive terminal electrically connected to each of said conductors in said third set of conductors so as to place them in parallel and having a negative terminal electrically connected to each of said conductors in said second set of conductors so as to place them in parallel, for generating D.C. pulses of less than a millimicrosecond pulse width.

References Cited by the Examiner

UNITED STATES PATENTS

| | | | |
|---|---|---|---|
| 2,957,315 | 10/60 | Wood | 62—3 |
| 3,088,288 | 5/63 | Elfving | 62—3 |
| 3,090,206 | 5/63 | Anders | 62—3 |

ROBERT A. O'LEARY, *Primary Examiner.*

WILLIAM J. WYE, *Examiner.*